UNITED STATES PATENT OFFICE.

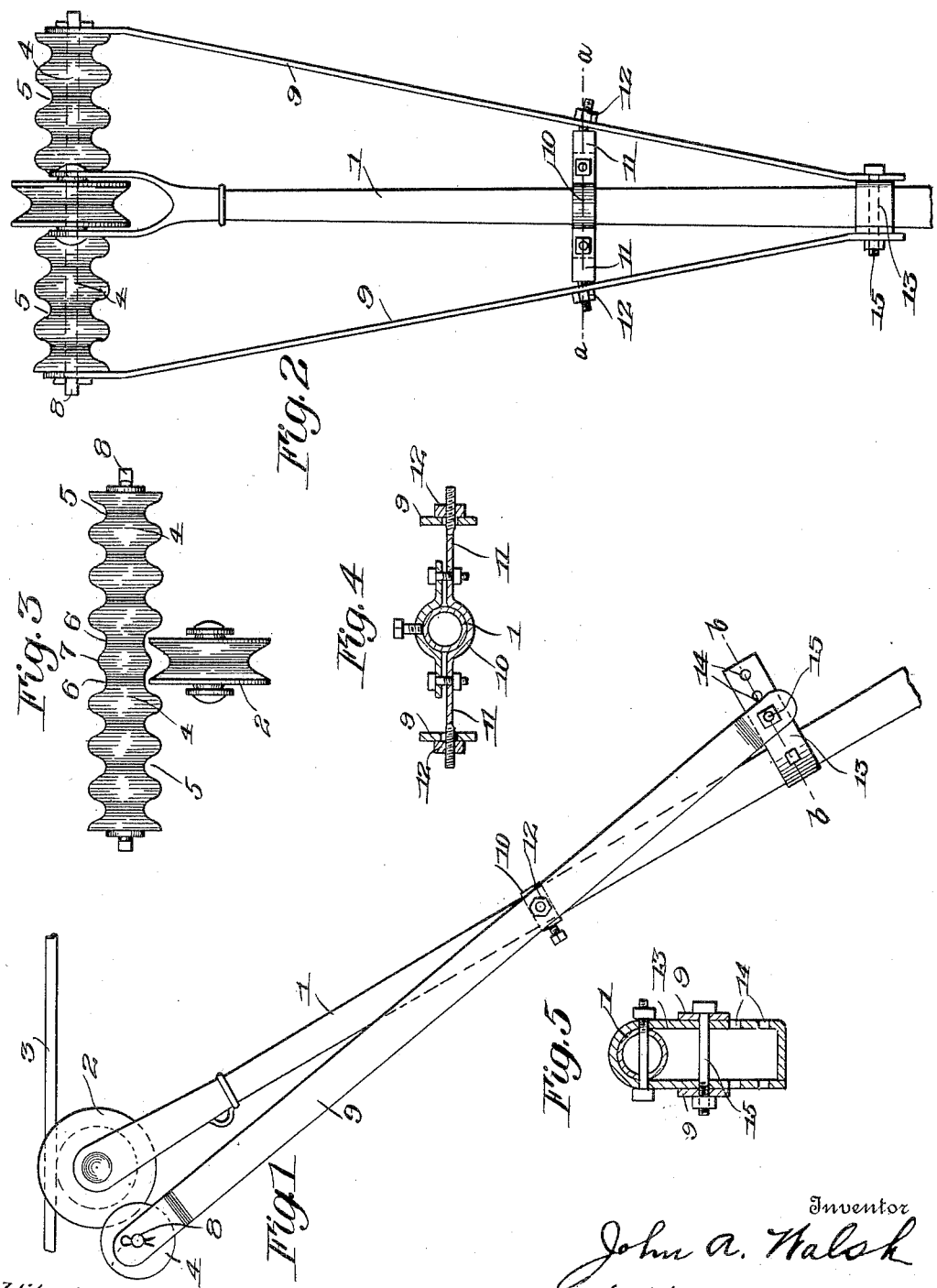

JOHN A. WALSH, OF ROCHESTER, NEW YORK.

ELECTRIC-RAILWAY TROLLEY.

1,098,698. Specification of Letters Patent. Patented June 2, 1914.

Application filed October 20, 1913. Serial No. 796,265.

*To all whom it may concern:*

Be it known that I, JOHN A. WALSH, of Rochester, in the county of Monroe and State of New York, have invented a new and useful Improvement in Electric-Railway Trolleys, which improvement is fully set forth in the following specification and shown in the accompanying drawings.

The present invention relates to electric railway trolleys and more particularly to that type provided with a guard or protecting device for preventing the upward movement of the trolley after the trolley wheel has slipped off the trolley wire, an object of this invention being to provide a construction in which the protecting device may be utilized temporarily as a trolley wheel without causing any injury to the cross wires or hangers.

To this and other ends the invention consists in certain parts and combinations of parts all of which will be hereinafter described, the novel features being pointed out in the appended claims.

In the drawings: Figure 1 is a side view of a trolley with the improved protecting device attached thereto; Fig. 2 is a view from the front of the trolley, with the pole perpendicular; Fig. 3 is a top view of the parts as shown in Fig. 2, illustrating the relation of the protecting device to the trolley wheel; Fig. 4 is a transverse section on the line *a—a*, Fig. 2; and Fig. 5 is a section on the line *b—b*, Fig. 1.

Referring more particularly to the drawings, 1 indicates the trolley pole which is of the usual construction and has a trolley wheel 2 rigidly supported at its upper end for coöperation with the trolley wire 3.

Supported in rear of the trolley wheel and having its uppermost portion below the bottom of the groove of the trolley wheel is a protecting device which comprises a single roller 4 projecting from opposite sides of the plane of the trolley wheel and having a number of circumferentially-arranged grooves therein, such grooves being similar to the groove of the trolley wheel and lying in planes on opposite sides of the plane of the trolley wheel. Those portions of the roller between the grooves are curved so as not to provide any wide or flat surfaces on which the trolley wire may rest in order to direct the wire into a proximate groove of the roller. That portion of the roller immediately in rear of the trolley wheel 2 is formed with two grooves 6 separated by a peripheral enlargement 7. These grooves 6 are for the reception of the flanges of the trolley wheel 2, permitting the protector to lie close to the trolley wheel in order that, when the trolley wheel slips off the trolley wire, the pole cannot move far before the protecting device will engage the wire. By having a grooved roller such as described, it is possible to catch and retain the wire within a groove of the roller, permitting the groove to be utilized like the groove of the usual trolley wheel and preventing the sidewise movement of the protecting roller while engaging the trolley wire. The grooves lie on opposite sides of the plane of the trolley wheel and are so positioned that those in proximity to the trolley wheel will most likely receive the wire, the other grooves being called into use only under abnormal conditions. The grooved roller is arranged below the plane of the trolley wheel so that when the latter is being used, the grooved roller will not interfere with cross wires or other suspension devices, yet should the trolley slip off the wire, the wide surface of the protecting roller will immediately be engaged by the trolley wire and the roller will act as the trolley wheel, preventing the pole from springing in the air and connecting with the cross wires, an action which, in many instances, tears down the trolley wires. The grooved roller easily passes over the cross wires as it is depressed slightly because the trolley wheel will engage such wires before the roller reaches them and thereby lower the trolley pole.

It is desirable that the uppermost portion of the grooved protecting roller shall operate in a plane as close as possible to the trolley wire, but no fixed adjustment of the roller with reference to the trolley wheel is desirable for the reason that trolley poles operate at different angles due to the fact that the trolley wires are different distances above the road beds in different systems. To this end, the grooved protecting roller is adjustably mounted with reference to the trolley wheel, being preferably mounted to rotate on a rigid shaft 8 which is supported by an adjustably mounted frame comprising preferably two arms 9 converging toward their lower ends and having the shaft 8 connecting them at their upper ends. This frame is pivotally mounted on the trolley pole 1 preferably by attaching the pivot member 10 to the pole, said pivot member comprising oppositely extending pivots 11 passing through eyes in the arms 9, the arms being held to the pivots by nuts 12. The pivot member is preferably in the form of two pieces clamped to the trolley pole as shown in Fig. 4 of the drawings.

At the lower ends of the diverging arms 9, an adjusting or securing device is provided for bolting the frame in its adjusted position. This device preferably comprises a loop member 13 surrounding and secured to the trolley pole 1 below the pivot member to project laterally from said pole. The laterally projecting portion is provided with a series of openings 14 for receiving the bolt 15 which is adapted to be passed through any one of said openings 14 and through the arms 9 of the pivoted frame. With this arrangement, the protecting roller may be raised and lowered with reference to the trolley wheel and thus adapted to the height of the trolley wire.

A trolley provided with the present improvements is not liable to jump into the air and tear down the overhead wire system. Immediately the trolley wheel slips off the wire, the grooved protecting roller engages such wire, permitting the car to continue on its way until such a time that the employee can readjust the pole so that the trolley wheel will engage the wire. The wide engaging surface of the grooved roller does not interfere with the cross wires or other obstructions as the trolley wheel is located in a higher plane than the grooved roller and will cause a depression of the pole before the groove roller will engage the cross wire. The grooved roller is adjustably mounted so that it may lie in a position relative to the trolley wheel, corresponding to the height of the trolley wire. The whole protecting device including the roller and its frame is simple in construction and involves but few parts which are not liable to get out of order.

What I claim as my invention and desire to secure by Letters Patent is:

1. In combination with a trolley pole having a trolley wheel rigidly supported thereon, a protecting device embodying a roller rigidly supported in rear of the trolley wheel so that the uppermost portion of said roller is below the bottom of the groove of the trolley wheel, said roller being provided with circumferentially arranged parallel grooves on opposite sides of the plane of the trolley wheel.

2. In combination with a trolley pole having a trolley wheel rigidly supported thereon, a protecting device embodying a single roller supported in rigid relation to the trolley pole and in rear of the trolley wheel, the uppermost portion of said roller being below the bottom of the groove of the trolley wheel and the roller extending on opposite sides of the plane of the trolley wheel and having provision immediately in rear of the trolley wheel for the reception of the flanges of the trolley wheel.

3. In combination with a trolley pole having a trolley wheel rigidly supported thereon, a protecting device embodying a single roller supported in rigid relation to the trolley pole and in rear of the trolley wheel, the uppermost portion of said roller being below the bottom of the groove of the trolley wheel and the roller extending on opposite sides of the plane of the trolley wheel and having provision immediately in rear of the trolley wheel for the reception of the flanges of the trolley wheel, said roller also having circumferential grooves on opposite sides of the plane of the trolley wheel to receive the wire when the trolley wheel slips off.

4. In combination with a trolley pole having a trolley wheel rigidly supported thereon, a protecting device embodying a single roller arranged in rear of the trolley wheel, a shaft on which the roller turns, a pair of converging arms pivotally supported between their ends on the trolley pole and connected at their upper ends by the shaft, a device projecting laterally from the trolley pole and provided with a plurality of bolt openings, and a bolt for passing through any one of said openings and through the arms below the pivot of the latter.

5. In combination with a trolley pole having a trolley wheel rigidly supported thereon, a protecting device embodying a single roller arranged in rear of the trolley wheel and formed with circumferentially arranged parallel grooves on opposite sides of the plane of the trolley wheel, a shaft on which the roller turns, a pair of converging arms pivotally supported between their ends on the trolley pole and connected at their upper ends by the shaft, and a securing device for adjustably and rigidly securing the lower ends of said arms.

JOHN A. WALSH.

Witnesses:
HAROLD H. SIMMS,
ADA M. WHITMORE.

Copies of this patent may be obtained for five cents each, by addressing the "Commissioner of Patents, Washington, D. C."